March 30, 1948.                S. RATTAY                2,438,619
                      GAS DISTRIBUTING SAFETY DEVICE
                          Filed Jan. 10, 1947
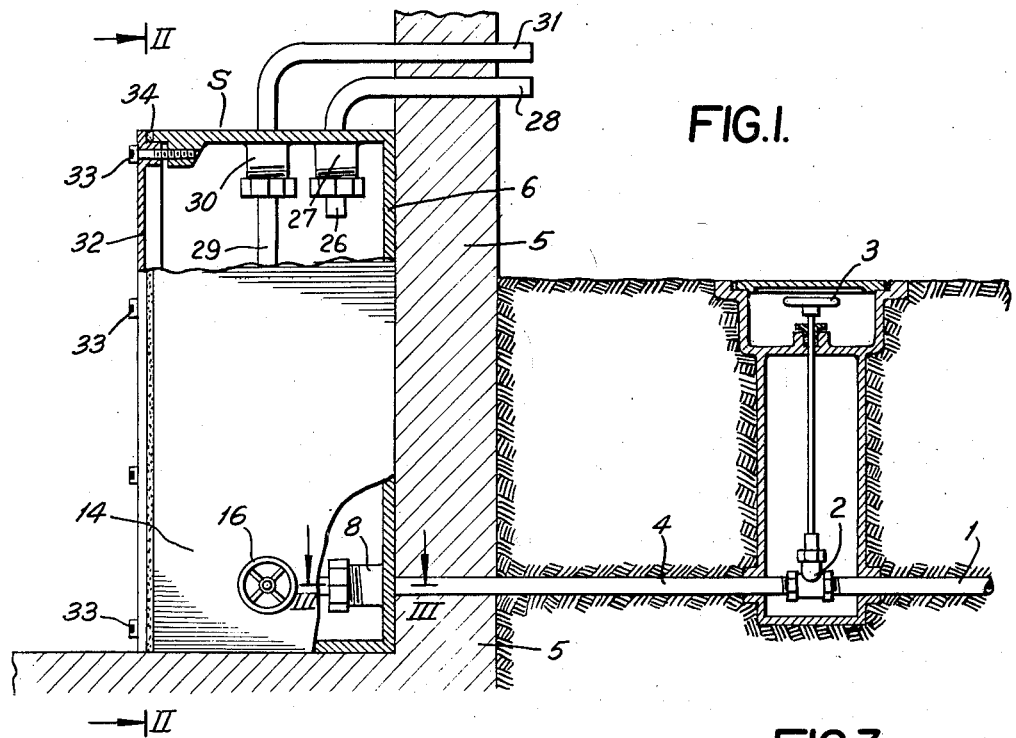
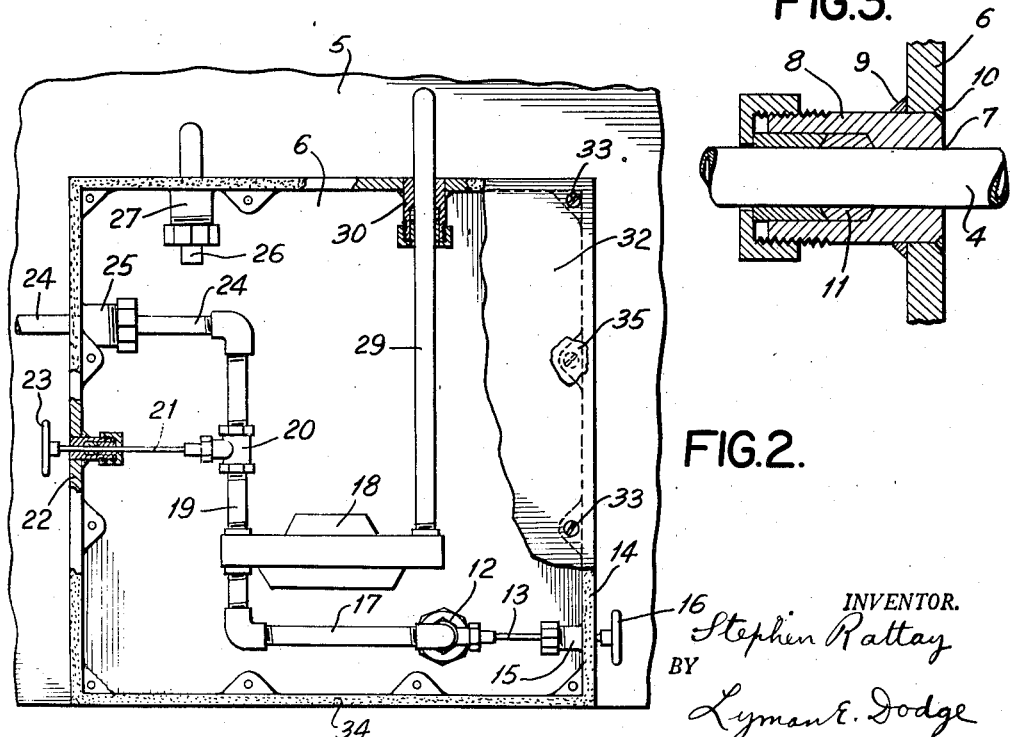
INVENTOR.
Stephen Rattay
BY
Lyman E. Dodge
ATTORNEY Patented Mar. 30, 1948

2,438,619

UNITED STATES PATENT OFFICE 2,438,619

GAS DISTRIBUTING SAFETY DEVICE

Stephen Rattay, New York, N. Y.

Application January 10, 1947, Serial No. 721,351

4 Claims. (Cl. 48—192)

1

This invention relates to gas distribution particularly distribution within a building, and more especially to a safety distribution cabinet.

A principal object of this invention is to provide a device to be located within a building to serve as a receiver for a gas supply main coming within the building and as a point of departure for a distribution main for supplying gas throughout a building together with auxiliary devices, such as pressure reducing valves, and manually operable valves, all so arranged that any gas improperly escaping will have a free path to the outside atmosphere and is prevented from diffusing within the building.

Other objects and advantages will appear as the description of the particular physical embodiment selected to illustrate the invention progresses and the novel features will be particularly pointed out in the appended claims.

In describing the invention in detail and the particular physical embodiment selected to illustrate the invention, reference will be had to the accompanying drawings and the several views thereon, in which like characters of reference designate like parts throughout the several views, and in which:

Fig. 1 is a cross sectional view illustrating a street gas supply main and my receiving cabinet positioned within a building; Fig. 2 is a cross sectional view of the device as shown by Fig. 1 on the plane indicated by the line II—II, viewed in the direction of the arrows at the ends of the line; Fig. 3 is a cross sectional view of the device as shown by Fig. 1 on the plane indicated by the line III—III, viewed in the direction of the arrows at the ends of the line.

Those skilled in the art of gas distribution for illuminating, domestic and industrial purposes, understand that the gas is generally conveyed through ducts which are generally buried underground and are tapped at an appropriate place to send a branch duct into a desired building. This is generally a plain uncovered pipe passing through the solid wall of the building.

It is further well known that, in some places, the gas in the main pipes and in the branch which enters a building is under a very considerable pressure. In some cases as high as 90 to 100 lbs. to the square inch. It is necessary, in every such situation, to reduce this pressure before supplying gas to the various gas using fixtures within a building. This reduction in pressure is generally made by means of a reducing valve which is situated within the building and is interposed in the branch pipe that enters the

2 building just after a main shut off valve is interposed therein. The presence of the main shut off valve and the reducing valve within the building gives rise to an opportunity for an unsafe condition. If any leak develops in any part of the apparatus or pipes between the pipe or duct leading from the reducing valve to the various fixtures in the building and where the branch pipe comes into the building, gas which may escape is backed by a very high pressure and may issue very quickly so as to create a potentially dangerous condition.

I propose to so arrange the inlet pipe coming into the building, the main shut off valve, the reducing valve, and the supply end of the pipe or duct leading to the various gas-consuming fixtures in the building in such a manner that any gas which escapes can readily pass out of the building into the outside atmosphere so as to avoid any mixture of combustible or explosive gas with the air within the building.

My preferred form of rendering the distribution of gas to a building safe is to bring the branch pipe from the main gas supply duct through the wall of the building and, preferably, immediately into my safety receiver and within my safety receiver position the main cut off valve and the reducing valve. I also provide means operable from without my receiver for turning the main valve on and off and also, I prefer to provide a shut off in the branch running to the gas consuming fixtures which is also positioned in the receiver and is operable from without the receiver by means extending, gas tight, through the walls of the receiver. By so positioning the various devices and supplying a vent or exit for gas from the safety receiver to the outside atmosphere, I provide a system which is entirely safe.

A preferred form of my invention is shown in the drawings. In the drawings, numeral I designates a branch duct from a main gas supply. This duct, as is usual, has a curb cock 2 installed therein. This curb cock is positioned so that free passage through the duct I may be cut off from without the house, as at the curb, as by means of a valve operating handle 3. From the valve 2, a pipe 4 passes through the wall 5 of the building and preferably immediately is projected into my safety cabinet designated as a whole by S.

My safety cabinet may be in various forms, but a substantially rectangular box-like structure suffices. In the particular form shown, the safety cabinet has a back 6 which preferably is positioned right against the outside wall 5 of the building. It is apertured at 7 and provided with a stuffing box 8 through which the pipe 4 extends. As the stuffing box 8 is preferably virtually made integral with the back 6 in any suitable manner, as by welding as at 9 and 10, no gas can escape from the receiver S through the stuffing box. The material 11 is of a suitable and well known form which is compressible and prevents any gas from escaping along the pipe 4 from within the receiver.

Immediately within the safety box I interpose a shut off valve 12 in the branch pipe 4. This valve has a stem 13 which extends through the side 14 of the box through a stuffing box 15 comparable to the stuffing box 8 and the stem is provided with a manually operable means 16 without the box so that the main valve may be operated from without the box.

From the main valve 12 the gas is conducted by the connections 17 to any appropriate reducing valve 18, which is positioned within the box. From the reducing valve 18 the pipe 19 extends having a valve 20 therein. The valve 20 has a stem 21 which extends without the side 22 of the box S and is provided with a manually operable means 23 by which the valve may be manipulated from without the box.

From the valve 20, connections 24 extend and pass through a stuffing box 25, the pipe 24 emerging from the side 22 of the box and in such a way, by reason of the stuffing box 25, no gas from within the box can escape to the outside of the box because the stuffing box 25 is formed like the stuffing box 8.

I prefer to vent the inside of the box by a pipe 26 which opens within the box, passes through a gas tight stuffing box 27, and then passes, as shown in Fig. 1, through the wall 5 of the building to the outside, as at 28. Any gas within the box can escape through the pipe 26 to the outside atmosphere.

I also prefer to connect a separate vent to the reducing valve 18, and so extend the pipe 29 through a stuffing box 30 and to the outside of the building as at 31.

My preferred construction includes a cover 32 for the box which is held thereto in any suitable or appropriate manner, as by cap screws 33. In order to render the joint between the box proper and its cover gas tight, I prefer to install a gasket 34 therebetween.

It should now be evident that my safety box is so constructed and arranged, and the gas supply pipe enters and leaves the box in such a manner, and the valve operating stems leave the box in such a manner that any gas escaping will be entirely confined to the interior of the box which has free egress to the outside atmosphere. By such an arrangement, the main branch pipe 4 could be wide open within the box and there would be no danger of gas being present within the building for it could all pass out of the pipe at 28. If the reducing valve became defective and the gas escaped therefrom it could all pass out through the pipe 29 to the exit at 31.

If for any reason it were necessary to shut the gas off from the gas consuming fixtures in the building it may quickly and easily be done by manipulating manually operable member 23 without the necessity of opening the box. If for any reason it is necessary to adjust the reducing valve 18, the main pipe 4 may be entirely shut off by the valve 12 manipulated from the outside of the box.

As the device is a safety device and as the safety feature would be entirely obliterated by removing the cover 32, and as this cover should only be removed by an experienced person, and preferably one in the employ of the company supplying gas, I prefer to place a seal over one or more of the screws 33 as shown at 35 which may well be a mass of sealing wax having any suitable design impressed therein. If the cover is removed by an unauthorized person it will be immediately known by the fact that the seal has been broken. Of course, sealing wax is only one way of accomplishing the object as any one of the numerous and well-known sealing devices may be substituted therefor.

If anything interferes with the proper operation of valve 12 or the valve 20 from the outside of the box or, for any other reason, it is necessary to shut the gas off from the box, then the gas may be entirely shut off by operating the curb cock 2.

From the hereinbefore given description, it will be apparent that my safety cabinet is simple in construction and is a combination of old and well known devices of which none are complicated or complex and that the operation of installing or manipulating the devices is within the easy comprehension of ordinary people. It is further quite evident that the device if installed in accordance with the description, will entirely obviate any danger from gas escaping in the building under high pressure.

It is to be understood that the mechanisms shown, illustrate, but do not limit the mechanism which may be installed in the safety cabinet, for instance, I do not intend to exclude the positioning of a gas meter, measuring gas consumed, within the cabinet suitably arranged whereby the meter may be read from the outside of the cabinet.

Although I have illustrated my safety cabinet mounted right against the outside wall of a building, it is to be understood that this is only the preferable mounting, and I do not mean to exclude other mountings, even if at a considerable distance from the entrance of the gas supply through the wall of the building.

Although I have particularly described one particular physical embodiment of my invention, nevertheless I desire to have it understood that the form selected is merely illustrative and does not exhaust the possible physical embodiments of the idea of means underlying my invention.

What I claim as new and desire to secure by Letters Patent is:

1. A gas distribution safety cabinet, including, in combination: walls forming a chamber, one of said walls forming a cover; means for removably attaching the cover gas tight; a plurality of orifices formed in the walls of the chamber; stuffing boxes, one attached to the walls gas tight at each orifice; pipes and valve operating stems passing gas tight through the stuffing boxes, at least one of said pipes connecting the chamber with out of doors.

2. A gas distribution safety cabinet, including, in combination: walls forming a chamber, one of said walls forming a cover; means for removably attaching the cover gas tight; gas supply regulating and distributing mechanism within the chamber, including shut off valves; pipes and valve stems passing through the walls of the chamber; means for rendering the pipes and valve stem gas tight whereby gas cannot pass out of the chamber along the pipes or valve stem, one, at least, of said pipes connecting the chamber with out of doors.

3. A gas distribution safety cabinet, including, in combination: walls forming a chamber, one of said walls forming a cover; means for removably attaching the cover gas tight; a plurality of orifices formed in the walls of the chamber; stuffing boxes, one attached to the walls gas tight at each orifice whereby gas valves, regulating, and distributing mechanisms may be positioned within the chamber and pipes may be connected thereto passing through the walls gas tight and valve stem for operating the valves may pass gas tight through the walls to be operable without the walls and, at least, one pipe may be connected to the chamber and out of doors as a vent for the chamber.

4. A gas distribution safety cabinet, including, in combination: walls forming a chamber, one of said walls forming a cover; means for removably attaching the cover gas tight; means for projecting a main gas supply pipe within the chamber gas tight with a wall; means for projecting a distributing gas pipe through a wall gas tight therewith; a pressure reducing valve within the chamber connecting the main gas supply pipe and distribution pipe; a shut off valve in the main supply pipe within the chamber and means extending gas tight through a wall of the chamber for operating the valve without the chamber and means projected through a wall of the chamber gas tight venting the chamber to out of doors.

STEPHEN RATTAY.